(12) United States Patent
Ohashi et al.

(10) Patent No.: US 11,952,148 B2
(45) Date of Patent: Apr. 9, 2024

(54) ROTOR MANUFACTURING METHOD

(71) Applicant: MITSUBISHI HEAVY INDUSTRIES, LTD., Tokyo (JP)

(72) Inventors: Kazuki Ohashi, Tokyo (JP); Naoaki Fujiwara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1 day.

(21) Appl. No.: 17/775,877

(22) PCT Filed: Sep. 28, 2020

(86) PCT No.: PCT/JP2020/036524
§ 371 (c)(1),
(2) Date: May 10, 2022

(87) PCT Pub. No.: WO2021/095376
PCT Pub. Date: May 20, 2021

(65) Prior Publication Data
US 2022/0388686 A1 Dec. 8, 2022

(30) Foreign Application Priority Data
Nov. 11, 2019 (JP) .................. 2019-204180

(51) Int. Cl.
*B29C 70/28* (2006.01)
*B29C 70/68* (2006.01)
(Continued)

(52) U.S. Cl.
CPC ................ *B64F 5/10* (2017.01); *B29C 70/28* (2013.01); *B29C 70/681* (2013.01); *B29C 70/86* (2013.01);
(Continued)

(58) Field of Classification Search
CPC ....................................................... B29C 70/28
See application file for complete search history.

(56) References Cited

U.S. PATENT DOCUMENTS

2012/0201703 A1    8/2012   Tanaka et al.
2016/0020008 A1    1/2016   Powell et al.

FOREIGN PATENT DOCUMENTS

CN     103620916 A    3/2014
EP      2773023 A1    9/2014
(Continued)

OTHER PUBLICATIONS

Extended European Search Report of European Application No. 20888319.9 dated Oct. 17, 2022; 10pp.
(Continued)

*Primary Examiner* — Jeffry H Aftergut
(74) *Attorney, Agent, or Firm* — HAUPTMAN HAM, LLP

(57) ABSTRACT

This method is for manufacturing a fan blade rotor which includes an annular rotation support ring around a rotary shaft, a permanent magnet provided alongside the rotation support ring in the radial direction, and a composite material for integrally binding the rotation support ring and the permanent magnet, the method including: a step S1 for arranging the rotation support ring and the permanent magnet side by side in the radial direction; steps S2-S4 for spirally winding, on the rotation support ring and the permanent magnet arranged side by side being as a core, the composite material being an uncured composite material including a reinforcement fiber impregnated with an uncured resin with the fiber direction of the reinforcement fiber set as a longitudinal direction; and a step for curing the resin included in the composite material.

14 Claims, 6 Drawing Sheets

(51) Int. Cl.
　　　*B29C 70/86* 　　　(2006.01)
　　　*B64F 5/10* 　　　(2017.01)
　　　*B29K 307/04* 　　　(2006.01)
　　　*B29L 31/00* 　　　(2006.01)
　　　*B64C 29/00* 　　　(2006.01)

(52) U.S. Cl.
　　　CPC .. *B29K 2307/04* (2013.01); *B29K 2995/0008* (2013.01); *B29L 2031/7498* (2013.01); *B64C 29/0008* (2013.01)

(56) References Cited

FOREIGN PATENT DOCUMENTS

| | | | |
|---|---|---|---|
| EP | 4060879 | A1 | 9/2022 |
| JP | 61-1246 | A * | 1/1986 |
| JP | 9-131027 | A * | 5/1997 |
| JP | 9-322450 | A * | 12/1997 |
| JP | 2001-136692 | A * | 5/2001 |
| JP | 2011005926 | A | 1/2011 |
| JP | 2015-91202 | A * | 5/2015 |
| JP | 2018039162 | A | 3/2018 |
| WO | 2012118797 | A2 | 9/2012 |
| WO | 2012118797 | A3 | 9/2012 |
| WO | 2021131196 | A1 | 7/2021 |

OTHER PUBLICATIONS

Decision of Refusal of Japanese Application No. 2019-204180 mailed Jan. 9, 2024; 4pp.

* cited by examiner

ROTOR MANUFACTURING METHOD

RELATED APPLICATIONS

The present application is a National Phase of International Application Number PCT/JP2020/036524 filed Sep. 28, 2020 and claims priority of Japan Application Number 2019-204180 filed Nov. 11, 2019.

TECHNICAL FIELD

The present invention relates to a rotor manufacturing method.

BACKGROUND ART

In the related art, a thrust generator has been known which includes a stator having an annular shape; a rotor having an annular shape that is provided inside the stator to be rotatable with respect to the stator; and a propeller member provided inside the rotor (for example, refer to PTL 1). A coil is provided on an inner peripheral side of the stator, and a permanent magnet is provided on an outer peripheral side of the rotor.

CITATION LIST

Patent Literature

[PTL 1] Japanese Unexamined Patent Application Publication No. 2011-5926

SUMMARY OF INVENTION

Technical Problem

A centrifugal force toward an outside in a radial direction is applied to the rotor in rotation. In general, a rotor side magnet such as the permanent magnet provided on the outer peripheral side of the rotor is bonded to the rotor with an adhesive agent, or is integrated with the rotor by forming a locking portion in the rotor side magnet and locking the locking portion to the rotor. However, since the rotor side magnet has a heavy specific gravity, and the rotor rotates at high speed, a large centrifugal force is applied to the rotor side magnet. When a large centrifugal force is applied to the rotor side magnet, it is difficult to obtain a sufficient load capacity at a bonding portion between the rotor and the rotor side magnet with the adhesive agent or the locking portion, so that design is difficult to carry out.

An object of the present invention is to provide a rotor manufacturing method capable of obtaining a sufficient load capacity even when a centrifugal force is applied.

Solution to Problem

According to one aspect of the present invention, there is provided a rotor manufacturing method for manufacturing a rotor including a rotating support ring having an annular shape around a rotation axis, magnetic bodies provided alongside the rotating support ring in a radial direction, and a composite material that integrally restrains the rotating support ring and the magnetic bodies, the method including: a first step of disposing the rotating support ring and the magnetic bodies to be arranged in the radial direction; a second step of spirally winding the composite material around the rotating support ring and the magnetic bodies arranged in the radial direction as a core, the composite material being not cured and containing reinforcement fibers infiltrated with a resin that is not cured, in which a fiber direction of the reinforcement fibers is a longitudinal direction; and a third step of curing the resin contained in the composite material.

Advantageous Effects of Invention

According to the present invention, it is possible to manufacture the rotor capable of having a sufficient load capacity even when a centrifugal force is applied.

DESCRIPTION OF EMBODIMENTS

Hereinafter, embodiments according to the present invention will be described in detail with reference to the drawings. Incidentally, the invention is not limited by the embodiments. In addition, the components in the following embodiments include components that can be easily replaced by those skilled in the art, or components that are substantially the same. Further, the components to be described below can be appropriately combined, and when there are a plurality of embodiments, the embodiments can be combined.

First Embodiment

A rotor manufacturing method according to a first embodiment is a method for manufacturing a fan blade rotor (rotor) to be provided in a motor-integrated fluid machine. The motor-integrated fluid machine is an axial fluid machine. The motor-integrated fluid machine is a motor-integrated fan 1 (hereinafter, also simply referred to as a fan 1) that takes in air from a suction port and discharges the air from a discharge outlet, thus to generate thrust. Incidentally, in the first embodiment, the motor-integrated fan 1 will be described as an application of the motor-integrated fluid machine, and the motor-integrated fluid machine is not limited to the configuration. The motor-integrated fluid machine may be applied, for example, as a motor-integrated thruster such as a propeller which takes in a liquid such as water or seawater from a suction port to inject the liquid from a discharge outlet, thus to generate thrust. First, before the rotor manufacturing method is described, the motor-integrated fan 1 will be described.

(Motor-Integrated Fan)

The motor-integrated fan 1 is provided in, for example, a vertical takeoff and landing aircraft such as a helicopter or a drone. The motor-integrated fan 1 provided in the vertical takeoff and landing aircraft generates thrust for lifting an airframe, or generates thrust for controlling the posture of the airframe. Incidentally, the motor-integrated fan 1 may be applied to, for example, an air cushion vehicle such as a hovercraft. Further, when the motor-integrated fan 1 is applied as a motor-integrated thruster, the motor-integrated fan 1 may be applied to ships.

Figure 1:
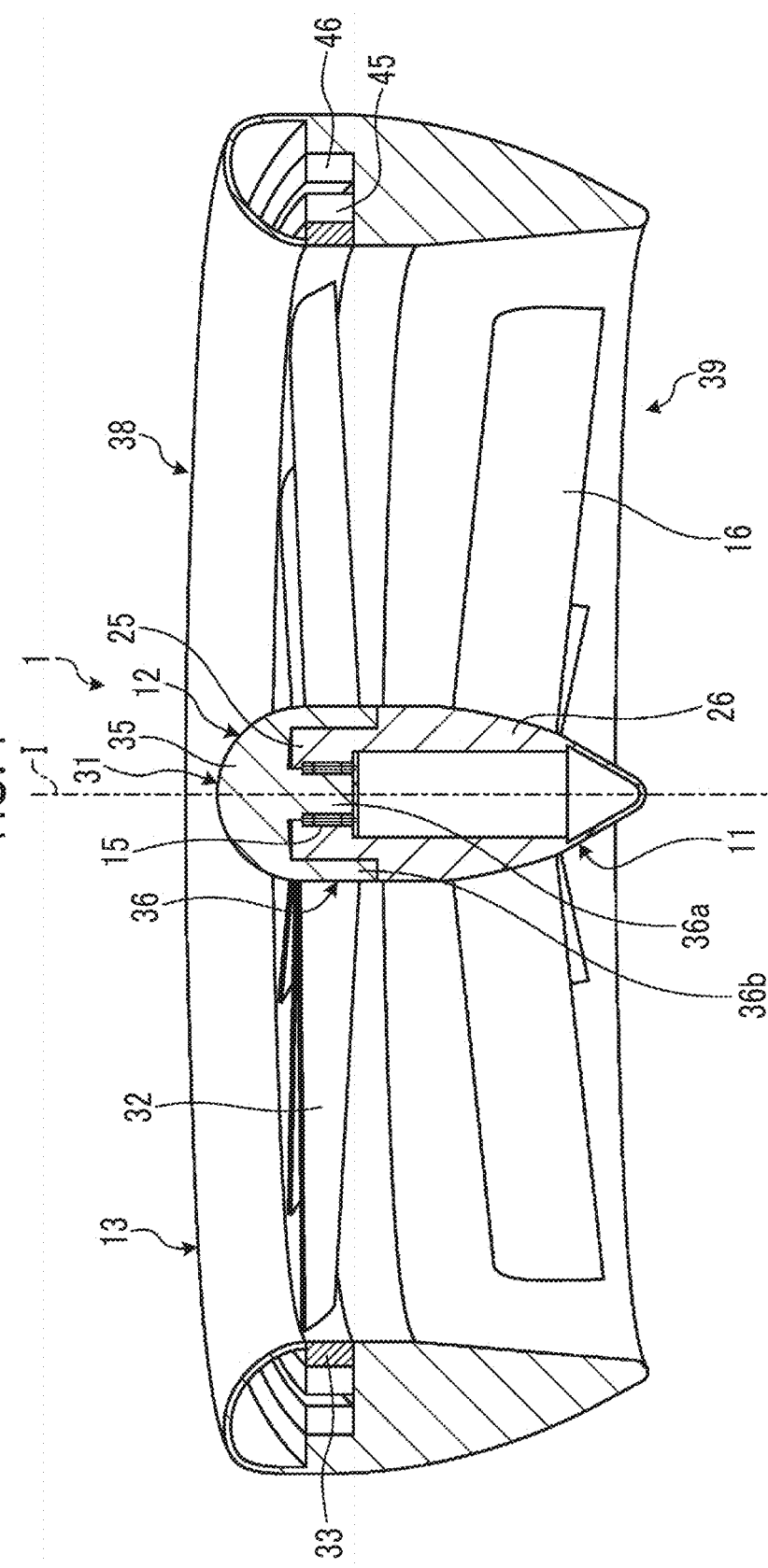
FIG. 1 is a cross-sectional view of a motor-integrated fan according to a first embodiment.
Figure 2:
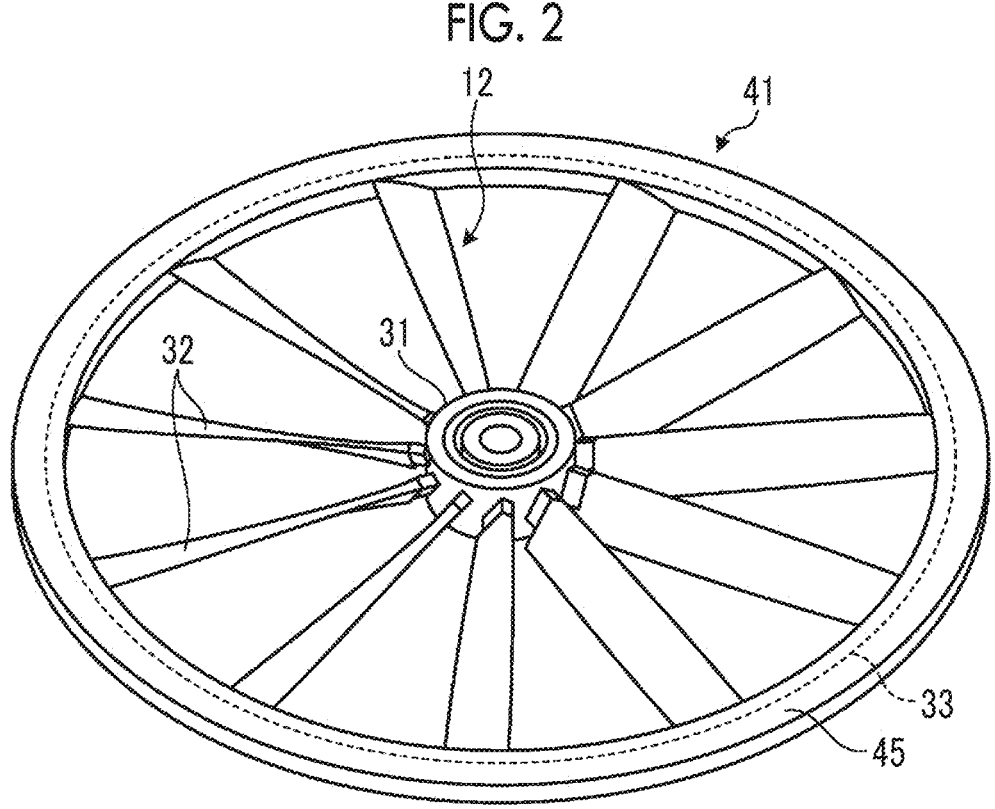
FIG. 2 is a perspective view of a fan blade according to the first embodiment.
Figure 3:
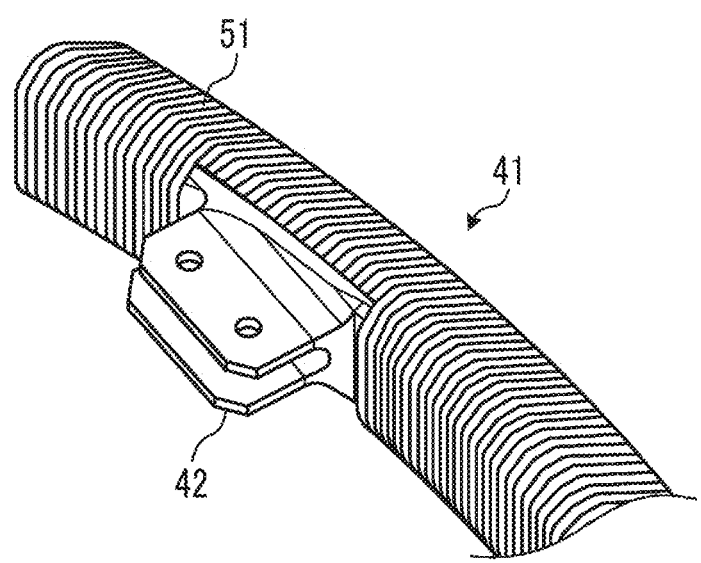
FIG. 3 is a partial perspective view illustrating a part of the fan blade according to the first embodiment.

The motor-integrated fan 1 will be described with reference to FIGS. 1 to 3. FIG. 1 is a cross-sectional view of the motor-integrated fan according to the first embodiment. FIG. 2 is a perspective view of a fan blade according to the first embodiment. FIG. 3 is a partial perspective view illustrating a part of the fan blade according to the first embodiment.

The motor-integrated fan 1 is called a duct-type propeller or a ducted fan. The motor-integrated fan 1 is used, for example, in a horizontal state where an axial direction is a vertical direction, and takes in air from an upper side in the vertical direction and discharges the air to a lower side in the vertical direction. Incidentally, the motor-integrated fan 1 may be used in a vertical state where the axial direction is a horizontal direction.

The motor-integrated fan 1 is a flat fan of which the length in the axial direction of the rotation axis I is shorter than the length in a radial direction of the rotation axis I. The motor-integrated fan 1 is a fan in which one motor is integrally provided, and includes a shaft portion 11, a rotating portion 12, an outer peripheral portion 13, a motor 14, a rolling bearing 15, and a guide vane 16.

The shaft portion 11 is provided at the center of the rotation axis I, and is a support system (fixed side). The axial direction of the rotation axis I is an upward and downward direction in FIG. 1, and is a direction along the vertical direction. For this reason, a flow direction of air is a direction along the axial direction of the rotation axis I, and the air flows from an upper side toward a lower side in FIG. 1. The shaft portion 11 includes a shaft side fitting portion 25 that is a portion provided on an upstream side in the axial direction of the rotation axis I, and a shaft body 26 that is a portion provided downstream of the shaft side fitting portion 25.

A hub 31 of the rotating portion 12 to be described later is fitted to the shaft side fitting portion 25. The shaft side fitting portion 25 has a cylindrical shape, and is provided to protrude from an end surface on the upstream side of the shaft body 26 in the axial direction. A space having a columnar shape is formed on a center side of the rotation axis I in the shaft side fitting portion 25. A part of the hub 31 of the rotating portion 12 is inserted into the space. In addition, an outer peripheral side of the shaft side fitting portion 25 is surrounded by a part of the hub 31 of the rotating portion 12.

The shaft body 26 has a substantially conical shape that is tapered from the upstream side toward a downstream side in the axial direction. For this reason, an outer peripheral surface of the shaft body 26 is a surface that extends from an outer side toward an inner side in the radial direction as the surface extends from the upstream side toward the downstream side in the axial direction. An internal space in which a device can be installed is formed inside the shaft body 26. Examples of the device include a control device, a camera and the like. In addition, an end portion on the radial inner side of the guide vane 16 is connected to the outer peripheral surface of the shaft body 26.

As illustrated in FIGS. 1 and 2, the rotating portion 12 is a rotating system (rotating side) that rotates around the shaft portion 11. The rotating portion 12 is provided on an inlet side, into which air flows, with respect to the shaft portion 11 in the axial direction of the rotation axis I. The rotating portion 12 includes the hub 31, a plurality of blades 32, and a rotating support ring 33.

The hub 31 is provided upstream of the shaft portion 11 in the axial direction, and is rotatably fitted to the shaft side fitting portion 25. The hub 31 includes a hub body 35 that is a portion provided on the upstream side in the axial direction, and a hub side fitting portion 36 that is a portion provided downstream of the hub body 35. The hub body 35 is formed such that an end surface on the upstream side is a hemispherical surface having a predetermined radius of curvature. The hub side fitting portion 36 has a shape complementary to that of the shaft side fitting portion 25. The hub side fitting portion 36 includes a central shaft 36a provided at the center of the rotation axis, and a cylindrical portion 36b that has a cylindrical shape and is provided on an outer peripheral side of the central shaft 36a. The central shaft 36a is inserted into the space of the shaft side fitting portion 25, the space being formed at the center of the rotation axis. The cylindrical portion 36b is provided to protrude from an end surface on the downstream side of the hub body 35 in the axial direction. The cylindrical portion 36b is disposed to surround an outer periphery of the shaft side fitting portion 25. At this time, the rolling bearing 15 is provided between an inner peripheral surface of the shaft side fitting portion 25 and an outer peripheral surface of the central shaft 36a of the hub 31.

Then, a surface extending from an end surface of the hub body 35 to the outer peripheral surface of the shaft body 26 via an outer peripheral surface of the cylindrical portion 36b is a surface that is smooth without a step.

The plurality of blades 32 are provided to extend from the hub 31 toward the outside in the radial direction, and are provided side by side at predetermined intervals in a circumferential direction. Each of the blades 32 has an airfoil shape. The plurality of blades 32 are made of a composite material. Incidentally, in the present embodiment, the plurality of blades 32 are made of a composite material; however, the material is not particularly limited, and the plurality of blades 32 may be made of, for example, a metallic material.

The rotating support ring 33 is formed in an annular shape around the rotation axis I. The rotating support ring 33 is connected to an outer peripheral side of the plurality of blades 32 in the radial direction of the rotation axis I. An end portion on a radial outer side of each of the blades 32 is fixed to the inner peripheral surface of the rotating support ring 33 via a joint fitting 42. In addition, a permanent magnet 45 of the motor 14 to be described later is held on an outer peripheral surface of the rotating support ring 33.

The rotating portion 12 is configured such that the hub 31, the plurality of blades 32, and the rotating support ring 33 are integrally joined, and rotates around the hub 31. In addition, as will be described in detail later, the permanent magnet 45 of the motor 14 is integrally held in the rotating portion 12 to form a fan blade rotor 41 in which the rotating portion 12 and the permanent magnet 45 are integrated as illustrated in FIG. 2.

The outer peripheral portion 13 is provided outside the shaft portion 11 in the radial direction, and is the support system (fixed side). The outer peripheral portion 13 is a duct that is formed in an annular shape, and is caused to generate thrust by the rotation of the rotating portion 12. In the outer peripheral portion 13 (hereinafter, referred to as the duct 13), an opening on the upstream side in the axial direction of the rotation axis I is a suction port 38, and an opening on the downstream side is a discharge outlet 39. In addition, the duct 13 has a shape in which when the rotating portion 12 rotates, air is suctioned from the suction port 38, and the suctioned air is discharged from the discharge outlet 39 to generate thrust. Specifically, the inner peripheral surface of the duct 13 on the downstream side of the rotating portion 12 is a surface that is widened from the suction port 38 side toward the discharge outlet 39 side.

An inside of the duct 13 forms annular internal space that accommodates the rotating support ring 33 of the rotating portion 12, the permanent magnet 45 of the motor 14, and a coil 46 of the motor 14 to be described later. The duct 13 holds the coil 46 thereinside at a position where the coil 46 faces the permanent magnet 45 held by the rotating portion 12, and the permanent magnet 45 and the coil 46 face each other in the radial direction. Namely, the duct 13 functions as a stator.

The motor 14 is an outer peripheral drive motor that provides power from a duct 13 side toward the rotating portion 12 to rotate the rotating portion 12. The motor 14 includes a rotor side magnet provided on a rotating portion 12 side, and a stator side magnet provided on the duct 13 side. In the first embodiment, the rotor side magnet is the permanent magnet 45, and the stator side magnet is the coil 46 which is an electromagnet.

The permanent magnets 45 are provided to be held on the outer peripheral surface of the rotating support ring 33, and are disposed in an annular shape in the circumferential direction. In addition, the permanent magnets 45 are configured such that positive poles and negative poles alternate at predetermined intervals in the circumferential direction. Incidentally, the permanent magnets 45 may be arranged in a Halbach array. The permanent magnet 45 is provided at a position where the permanent magnet 45 faces the coil 46 in the radial direction of the rotation axis I. The permanent magnets 45 are not limited to having an annular magnet. A plurality of the permanent magnets 45 may be disposed at predetermined intervals along the circumferential direction. Namely, the permanent magnets 45 may be discretely disposed. In this case, a non-magnetized material may be disposed between the permanent magnets 45 arranged in the circumferential direction. An arbitrary number of the permanent magnets 45 can be disposed by discretely disposing the permanent magnets 45.

A plurality of the coils 46 are provided to be held inside the duct 13 and to face the poles of the permanent magnets 45, and are provided side by side in the circumferential direction. The coil 46 is provided at a position where the coil 46 faces the permanent magnet 45 held by the rotating portion 12, in the axial direction of the rotation axis I. Namely, the permanent magnet 45 and the coil 46 are disposed to face each other in the axial direction of the rotation axis I, which is an axial disposition.

The rolling bearing 15 is provided between the inner peripheral surface of the shaft side fitting portion 25 of the shaft portion 11 and the outer peripheral surface of the central shaft 36a of the hub 31 of the rotating portion 12. The rolling bearing 15 connects the shaft portion 11 and the rotating portion 12 while allowing the rotating portion 12 to rotate with respect to the shaft portion 11. The rolling bearing 15 is, for example, a ball bearing or the like.

The guide vane 16 is provided to connect the shaft portion 11 and the duct 13. The guide vane 16 is provided downstream of the rotating portion 12 in the axial direction of the rotation axis I. Namely, the guide vane 16 is provided at the position of a downstream portion 43 of the duct 13 in the axial direction. A plurality of the guide vanes 16 are provided side by side in a circumferential direction of the rotation axis I. In addition, the guide vane 16 has a streamlined shape such as an airfoil shape, and guides air, which flows from the rotating portion 12, to generate thrust. Incidentally, the shape of the guide vane 16 is not limited to an airfoil shape, and may be a plate shape.

In the motor-integrated fan 1 described above, power generated by a magnetic field is applied from the duct 13 side to the rotating portion 12 by the motor 14, so that the rotating portion 12 rotates. When the rotating portion 12 rotates, the motor-integrated fan 1 suctions air from the suction port 38, and discharges the air toward the discharge outlet 39. The air discharged from the rotating portion 12 flows along the inner peripheral surface of the duct 13 to generate thrust. At this time, the flow of the air is guided by the guide vanes 16, so that thrust is also generated by the guide vanes 16.

(Fan Blade Rotor)

Next, the fan blade rotor 41 in which the rotating portion 12 and the permanent magnets 45 are integrated will be described with reference to FIGS. 2 to 3. The fan blade rotor 41 includes the rotating portion 12, the permanent magnets 45, and a restraining portion 51.

For example, the restraining portion 51 uses a composite material (hereinafter, referred to as a composite material 51), and is wound around the rotating support ring 33 and the permanent magnets 45 from outside the rotating support ring 33 of the rotating portion 12 and the permanent magnets 45. The composite material 51 is obtained by curing carbon fibers infiltrated with a resin, for example by curing a prepreg. In addition, the composite material 51 is a sheet-shaped material having a narrow width. The composite material 51 is thinner than a thickness of the permanent magnet 45 in the axial direction.

As illustrated in FIG. 3, the composite material 51 before curing is spirally wound around the rotating support ring 33 and the permanent magnets 45 each extending in the circumferential direction as a core, and is integrally cured therewith, to integrally restrain the rotating support ring 33 and the permanent magnets 45. In addition, the joint fitting 42 that joins the end portion on the radial outer side of the blade 32 to the rotating support ring 33 is provided on an inner peripheral side of the rotating support ring 33, and the composite material 51 integrally restrains the joint fitting 42 together with the rotating support ring 33 and the permanent magnets 45. In addition, the composite material 51 is wound around an entire circumference of the rotating support ring 33.

Figure 4:
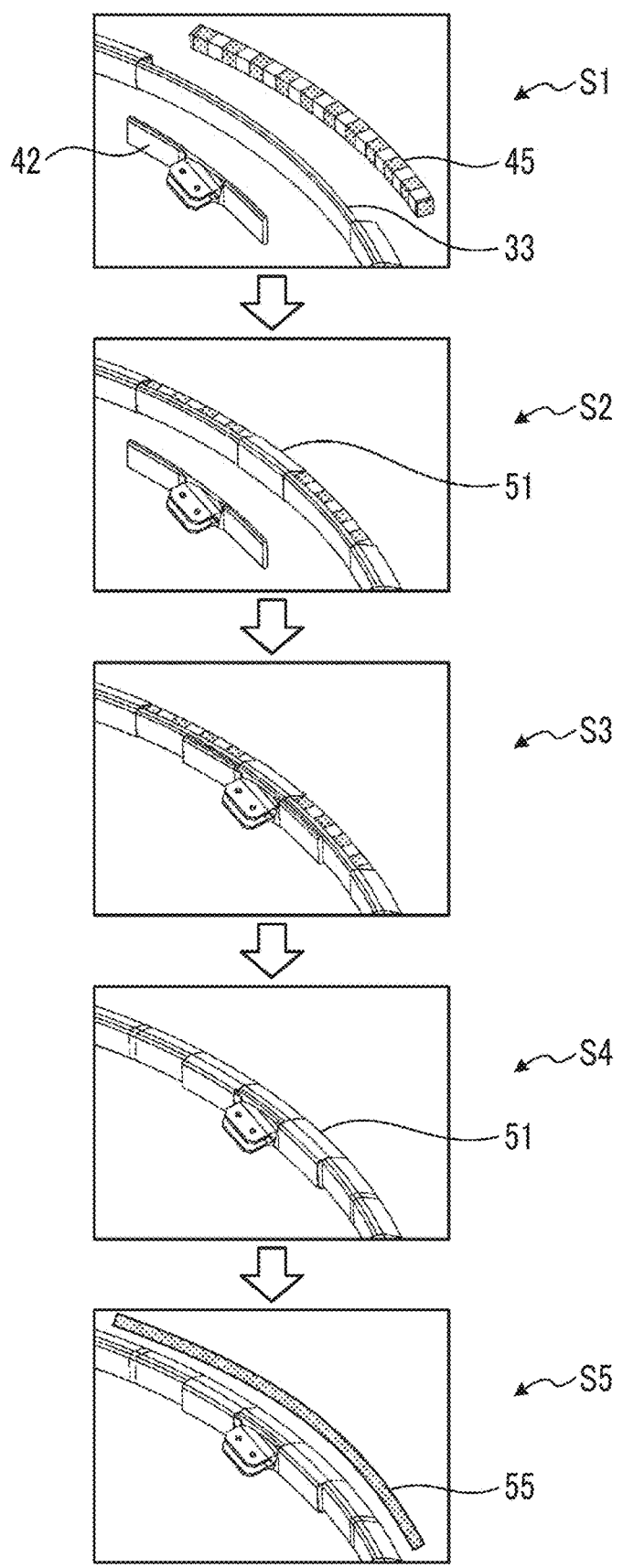
FIG. 4 is a description view regarding a rotor manufacturing method according to the first embodiment.

Next, a method for manufacturing the fan blade rotor 41 will be described with reference to FIG. 4. First, the rotating support ring 33, the permanent magnets 45, and the joint fitting 42 that form a part of the fan blade rotor 41 are prepared (step S1). In step S1, the permanent magnets 45 (non-magnetized) before magnetization, namely, magnetic bodies are prepared as the permanent magnets 45. In addition, in step S1, in order to position the rotating support ring 33 and the permanent magnets 45 at a predetermined position, the rotating support ring 33 and the permanent magnets 45 are temporarily fixed using an adhesive agent. Specifically, a width of the rotating support ring 33 in the axial direction of the rotation axis I (front-back direction of the sheet of FIG. 5) is wider than a width of each of the permanent magnets 45 in the axial direction, and in step S1, the rotating support ring 33 and the permanent magnets 45 are temporarily fixed with an adhesive agent such that the permanent magnets 45 are disposed at the center of the rotating support ring 33 in the axial direction. The permanent magnets 45 that are temporarily fixed are positioned on an outer peripheral side of the rotating support ring 33.

Subsequently, a step (second step) of spirally winding the composite material 51 around the rotating support ring and the permanent magnets 45 is performed with the rotating support ring 33 and the permanent magnets 45 arranged in the radial direction as a core. Specifically, steps S2 to S4 are preformed to integrate the rotating support ring 33, the permanent magnets 45, and the joint fitting 42 with the composite material 51.

In step S2, the composite material 51 is wound around the rotating support ring 33 and the permanent magnets 45 at a portion before the joint fitting 42 is disposed. Specifically, since in step S4 to be described later, it is difficult to wind the composite material 51 such that the rotating support ring 33, the permanent magnets 45, and the joint fitting 42 are integrated, in step S2, at a portion of the rotating support ring 33 and of the permanent magnets 45, of which the position in the circumferential direction overlaps a portion of the joint fitting 42 that engages with an end portion of the blade 32, the composite material 51 is wound in advance such that the rotating support ring 33 and the permanent magnets 45 are integrated.

Subsequently, in step S3, the joint fitting 42 is disposed at the portion around which the composite material 51 is wound. In step S3, in order to position the rotating support ring 33 and the joint fitting 42 at a predetermined position, the rotating support ring 33 and the joint fitting 42 may be temporarily fixed using an adhesive agent.

Then, in step S4, the composite material 51 is wound such that the rotating support ring 33, the permanent magnets 45, and the joint fitting 42 are integrated. In step S4, the composite material 51 is wound around a portion other than the portion around which the composite material 51 is wound in step S2. For this reason, steps S2 and S4 are performed to wind the composite material 51 around the entire circumference of the rotating support ring 33 in a discontinuous manner. Incidentally, in the first embodiment, since the joint fitting 42 includes the portion that engages with the end portion of the blade 32, the composite material 51 is wound around the rotating support ring 33 and the permanent magnets 45 in a discontinuous state, but if there is no portion interfering with winding, the composite material 51 may be wound around the entire circumference of the rotating support ring 33 in a continuous state. In this case, for example, first, the rotating support ring 33 and the permanent magnets 45 are integrated by winding the composite material 51 around an entire circumference thereof. Thereafter, the rotating support ring 33, the permanent magnets 45, and the joint fitting 42 may be integrated by superposing the joint fitting 42 on the rotating support ring 33 integrated with the permanent magnets 45, and by winding the composite material 51 thereuntil. Incidentally, a specific way of winding the composite material 51 will be described later.

After the execution of step S4, a step (third step) of curing the resin contained in the composite material 51 is performed. Here, the resin contained in the composite material 51 is, for example, a thermosetting resin, and in this step, the rotating support ring 33, the permanent magnets 45, and the joint fitting 42 around which the composite material 51 is wound are heated to cure the resin. The composite material 51 after the curing of the resin restrains and integrates the rotating support ring 33, the permanent magnets 45, and the joint fitting 42.

After the composite material is cured, the magnetization of the permanent magnets 45 that are not magnetized is performed using a magnetizing device 55, to magnetize the permanent magnets 45 (fourth step: step S5). After the execution of step S5, the hub 31 and the blade 32 are attached using the joint fitting 42, to form the fan blade rotor 41, and a series of steps of manufacturing the fan blade rotor 41 are completed.

Figure 5:
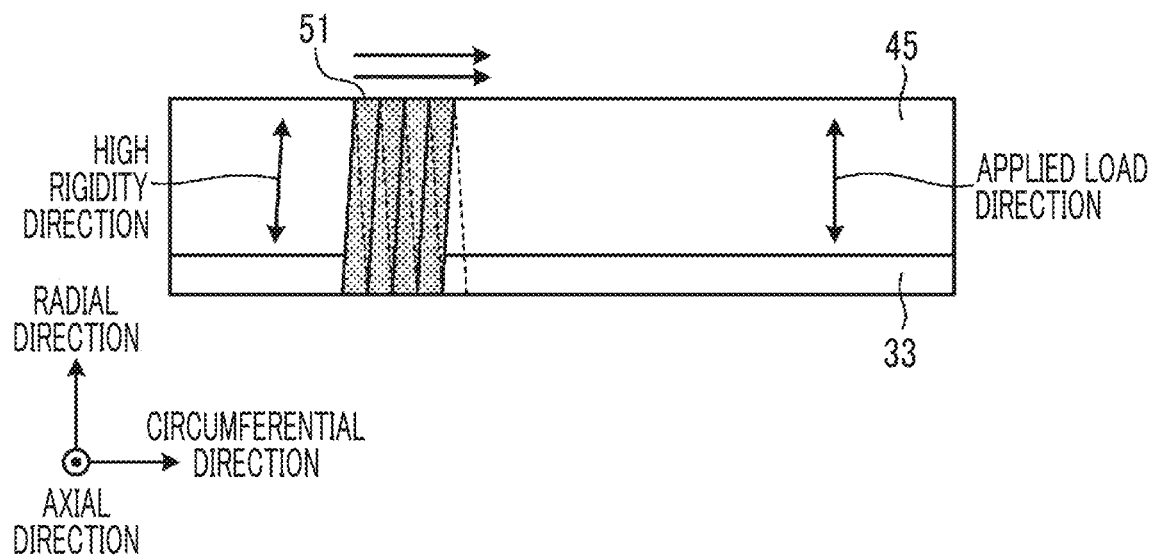
FIG. 5 is a description view illustrating a way of winding a composite material according to the first embodiment.

Next, a way of winding the composite material 51 will be described with reference to FIG. 5. FIG. 5 is a simplified illustration of the rotating support ring 33 and the permanent magnets 45. When the composite material 51 is wound in steps S2 and S4, the composite material 51 is wound in an overlapping manner in a circumferential direction (left-right direction in FIG. 5) of the rotating support ring 33. Namely, in the composite material 51 that is spirally wound in the circumferential direction, a part of one turn of the composite material 51 and a part of the other turn of the composite material 51 that are adjacent to each other in the circumferential direction are superposed on each other.

Specifically, in the way of winding the composite material 51 illustrated in FIG. 5, winding is performed while causing turns of the composite material 51 to overlap each other by half a width in a width direction orthogonal to a longitudinal direction of the composite material 51. In this case, since the longitudinal direction of the composite material 51 is a fiber direction, the longitudinal direction is a high rigidity direction. In addition, as illustrated in FIG. 5, since a centrifugal force is applied to the permanent magnets 45, the radial direction is an applied load direction. Then, since winding is performed while causing turns of the composite material 51 to overlap each other by half a width in the circumferential direction, the high rigidity direction can be brought close to the applied load direction. In addition, since winding is performed while causing turns of the composite material 51 to overlap each other by half a width in the circumferential direction, two layers can be formed by the composite material 51.

In addition, in the way of winding the composite material 51 illustrated in FIG. 5, the composite material may be repeatedly wound toward one side in the circumferential direction of the rotating support ring 33 to layer the composite material 51 in a radial direction of the rotating support ring 33. Incidentally, in FIG. 5, winding is performed while causing turns of the composite material 51 to overlap each other by half a width in the circumferential direction, but the present invention is not particularly limited to the configuration. The overlap width may be set to any width as long as turns of the composite material 51 overlap each other in the circumferential direction.

As described above, according to the first embodiment, the rotating support ring 33 and the permanent magnets 45 can be integrally restrained by the composite material 51. For this reason, even when the permanent magnets 45 are disposed on the outer peripheral side of the rotating support ring 33, the fan blade rotor 41 capable of withstanding a centrifugal force can be manufactured.

In addition, according to the first embodiment, the permanent magnets 45 that are not magnetized in step S1 can be used to magnetize the permanent magnets 45 into magnets in step S5. For this reason, even when the heating temperature is a temperature where magnetism is lost during thermal curing of the composite material 51, the permanent magnets 45 can be magnetized after the composite material 51 is cured. Therefore, an influence of the heating of the composite material 51 on the magnetism of the permanent magnets 45 can be suppressed.

In addition, according to the first embodiment, in a case where the joint fitting 42 is disposed and then the composite material 51 is wound around the rotating support ring 33 and the permanent magnets 45, even when it is difficult to wind the composite material 51 around a portion on which the joint fitting 42 is disposed, the composite material 51 can be appropriately wound around the rotating support ring 33 and the permanent magnets 45 in advance.

In addition, according to the first embodiment, since the composite material 51 can be wound around the entire circumference of the rotating support ring 33, a configuration capable of withstanding a centrifugal force over the entire circumference of the rotating support ring 33 can be obtained.

In addition, according to the first embodiment, the composite material 51 can be wound around the rotating support ring 33 and the permanent magnets 45 while causing turns of the composite material 51 to overlap each other in the circumferential direction of the rotating support ring 33. For this reason, since the high rigidity direction of the composite material 51 can be brought close to the applied load direction of the permanent magnets 45, the fan blade rotor 41 that is strong against a centrifugal force can be manufactured.

Second Embodiment

Figure 6:
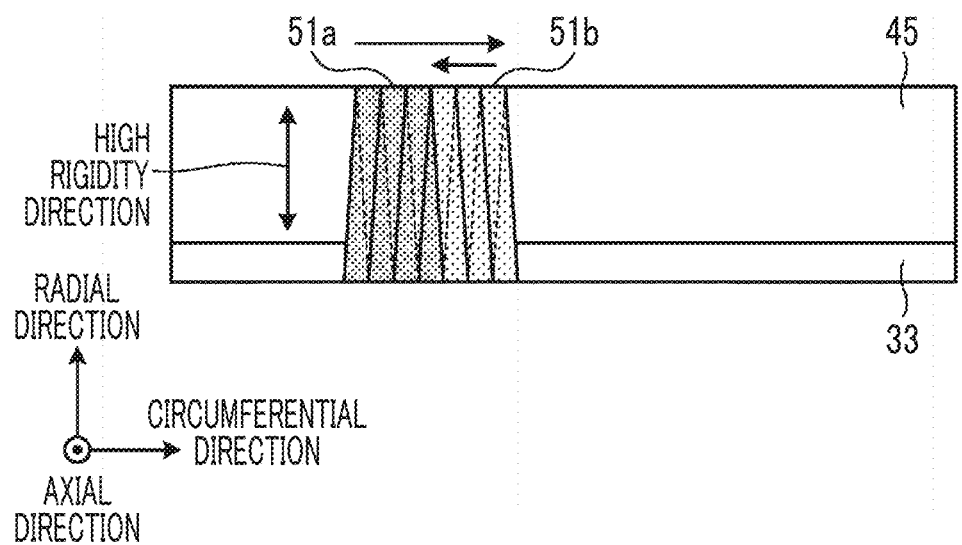
FIG. 6 is a description view illustrating a way of winding a composite material according to a second embodiment.

Next, a method for manufacturing the fan blade rotor 41 according to a second embodiment will be described with reference to FIG. 6. Incidentally, in the second embodiment, in order to avoid a duplicated description, portions different from those in the first embodiment will be described, and portions having the same configurations as those in the first embodiment will be described with the same reference signs assigned thereto. FIG. 6 is a description view illustrating a way of winding a composite material according to the second embodiment.

In the manufacturing method of the second embodiment, the way of winding the composite material 51 is different from that of the first embodiment. FIG. 6 is a simplified illustration of the rotating support ring 33 and the permanent magnets 45 similarly to FIG. 5. As illustrated in FIG. 6, when the composite material 51 is wound in steps S2 and S4, similarly to FIG. 5, the composite material 51 is wound in an overlapping manner in the circumferential direction (left-right direction in FIG. 6) of the rotating support ring 33. On the other hand, the composite material 51 includes a composite material 51a that is wound toward one side in the circumferential direction of the rotating support ring 33 and a composite material 51b that is wound toward the other side in the circumferential direction of the rotating support ring 33. When the composite material 51a is spirally wound around the rotating support ring 33 and the permanent magnets 45 as a core, winding is performed such that a spiral direction is a forward rotation direction. On the other hand, when the composite material 51b is spirally wound around the rotating support ring 33 and the permanent magnets 45, winding is performed such that a spiral direction is a reverse rotation direction opposite that of the composite material 51a.

As described above, in the way of winding the composite material 51 illustrated in FIG. 6, the composite material 51a is wound around the rotating support ring 33 and the permanent magnets 45 in the forward rotation direction toward the one side in the circumferential direction of the rotating support ring 33. Thereafter, the composite material 51b is wound around the rotating support ring 33 and the permanent magnets 45 in the reverse rotation direction toward the other side in the circumferential direction of the rotating support ring 33. Accordingly, the composite material 51 can be wound around the rotating support ring 33 and the permanent magnets 45 to form at least two layers.

As described above, according to the second embodiment, since the composite material 51a is wound around the rotating support ring 33 and the permanent magnets 45 in the forward rotation direction, and the composite material 51b is wound therearound in the reverse rotation direction, a fiber direction of the composite material 51a and a fiber direction of the composite material 51b can intersect with each other. For this reason, a circumferential component of a high rigidity direction of the composite material 51a and a circumferential component of a high rigidity direction of the composite material 51b cancel each other out. Therefore, a high rigidity direction of the composite material 51 can be appropriately aligned with the applied load direction, and the fan blade rotor 41 that is much strong against a centrifugal force can be manufactured.

Incidentally, in the second embodiment, the spiral direction of the composite material 51a is set to the forward rotation direction, and the spiral direction of the composite material 51b is set to the reverse rotation direction, but a configuration in the following modification example may be adopted. The composite material 51 is wound toward the one side in the circumferential direction of the rotating support ring 33, and then wound toward the other side in the circumferential direction at an arbitrary position in the circumferential direction. Namely, the winding of the composite material 51 is switched from winding toward the one side in the circumferential direction to winding toward an opposite side (the other side) in the circumferential direction at an arbitrary position in the circumferential direction as switching position. In this case, when the composite material 51 is spirally wound around the rotating support ring 33 and the permanent magnets 45 as a core, winding is performed such that the spiral direction is one direction (forward rotation direction or reverse rotation direction) before and after switching, namely, winding is performed without changing the spiral direction.

Third Embodiment

Figure 7:
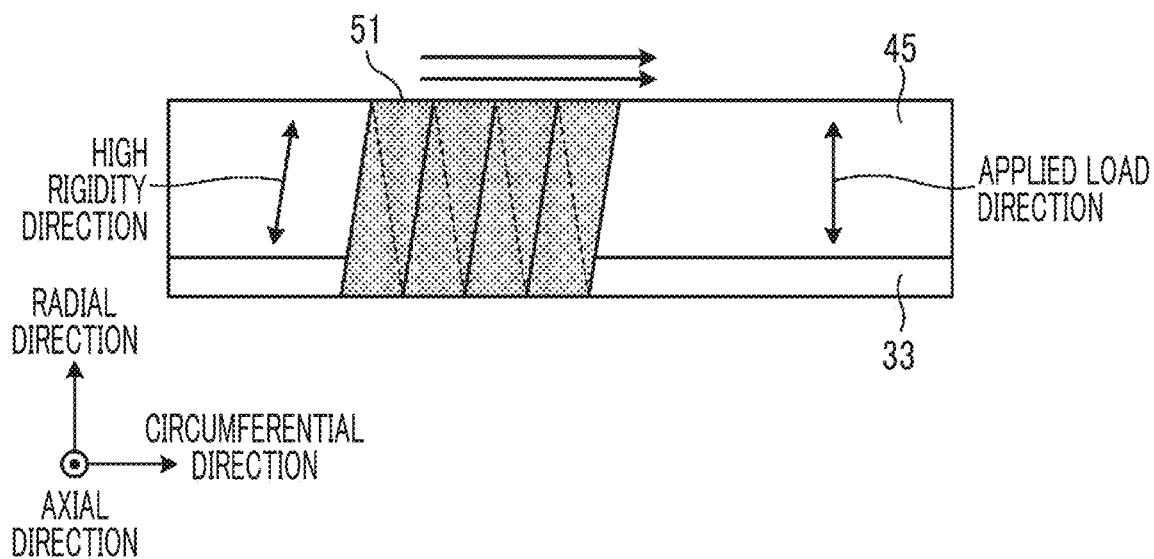
FIG. 7 is a description view illustrating a way of winding a composite material according to a third embodiment.

Next, a method for manufacturing the fan blade rotor 41 according to a third embodiment will be described with reference to FIG. 7. Incidentally, also in the third embodiment, in order to avoid a duplicated description, portions different from those in the first and second embodiments will be described, and portions having the same configurations as those in the first and second embodiments will be described with the same reference signs assigned thereto. FIG. 7 is a description view illustrating a way of winding a composite material according to the third embodiment.

In the manufacturing method of the third embodiment, the way of winding the composite material 51 is different from that of the first embodiment. FIG. 7 is a simplified illustration of the rotating support ring 33 and the permanent magnets 45 similarly to FIG. 5. As illustrated in FIG. 7, when the composite material 51 is wound in steps S2 and S4, the composite material 51 is wound around the rotating support ring 33 and the permanent magnets 45 while causing turns of the composite material 51 to be adjacent to each other in the circumferential direction of the rotating support ring 33. Namely, in the composite material 51 that is spirally wound in the circumferential direction, one turn of the composite material 51 and the other turn of the composite material 51 that are adjacent to each other in the circumferential direction are in contact with each other with a gap therebetween.

Figure 9:
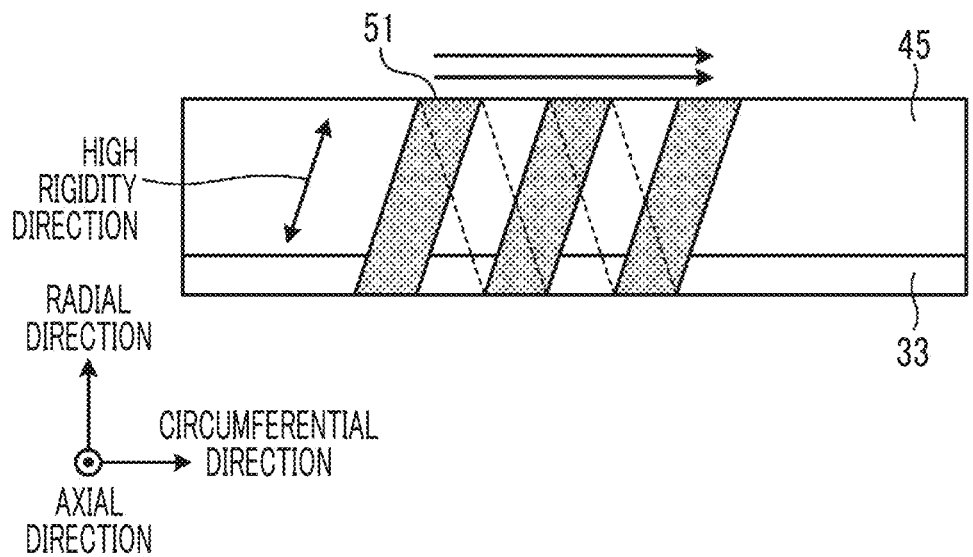
FIG. 9 is a description view illustrating a way of winding a composite material according to a fifth embodiment.

The way of winding the composite material 51 illustrated in FIG. 7 eliminates the need to manage an overlap amount (overlap width) since turns of the composite material 51 overlap each other in the circumferential direction as illustrated in FIG. 5 in the first embodiment, and eliminates the need to manage a gap between turns of the composite material 51 in the circumferential direction as illustrated in FIG. 9 to be described later.

In addition, in the way of winding the composite material 51 illustrated in FIG. 7, the composite material may be repeatedly wound toward one side in the circumferential direction of the rotating support ring 33 to layer the composite material 51 in the radial direction of the rotating support ring 33.

As described above, according to the third embodiment, since the composite material 51 is wound around the rotating support ring 33 and the permanent magnets 45 while causing turns of the composite material 51 to be adjacent to each other in the circumferential direction of the rotating support ring 33, the overlap amount and the gap do not need to be managed, so that the manufacturability can be facilitated.

Fourth Embodiment

Figure 8:
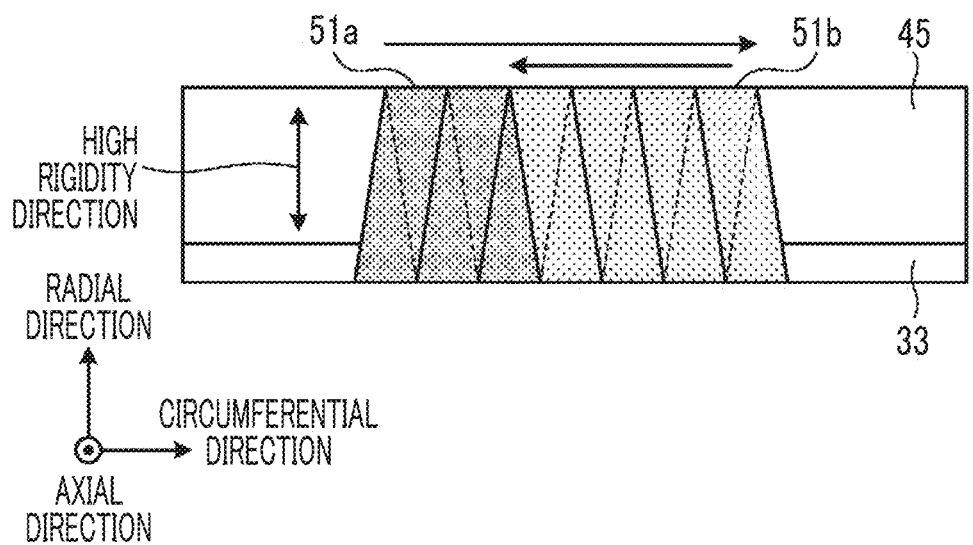
FIG. 8 is a description view illustrating a way of winding a composite material according to a fourth embodiment.

Next, a method for manufacturing the fan blade rotor 41 according to a fourth embodiment will be described with reference to FIG. 8. Incidentally, also in the fourth embodiment, in order to avoid a duplicated description, portions different from those in the first to third embodiments will be described, and portions having the same configurations as those in the first to third embodiments will be described with the same reference signs assigned thereto. FIG. 8 is a description view illustrating a way of winding a composite material according to the fourth embodiment.

In the manufacturing method of the fourth embodiment, the way of winding the composite material 51 is different from that of the third embodiment. FIG. 8 is a simplified illustration of the rotating support ring 33 and the permanent magnets 45 similarly to FIG. 7. As illustrated in FIG. 8, when the composite material 51 is wound in steps S2 and S4, similarly to FIG. 7, winding is performed while causing turns of the composite material 51 to be in contact with each other without a gap therebetween in the circumferential direction (left-right direction in FIG. 8) of the rotating support ring 33. On the other hand, similarly to FIG. 6 in the second embodiment, the composite material 51 includes the composite material 51a that is wound toward one side in the circumferential direction of the rotating support ring 33, and the composite material 51b that is wound toward the other side in the circumferential direction of the rotating support ring 33. The composite material 51a is spirally wound around the rotating support ring 33 and the permanent magnets 45 as a core, in the forward rotation direction. On the other hand, the composite material 51b is spirally wound around the rotating support ring 33 and the permanent magnets 45 as a core in the reverse rotation direction.

As described above, according to the fourth embodiment, similarly to the second embodiment, since the composite material 51a is wound around the rotating support ring 33 and the permanent magnets 45 in the forward rotation direction, and the composite material 51b is wound there- around in the reverse rotation direction, a fiber direction of the composite material 51a and a fiber direction of the composite material 51b can intersect with each other. For this reason, a circumferential component of a high rigidity direction of the composite material 51a and a circumferential component of a high rigidity direction of the composite material 51b cancel each other out. Therefore, a high rigidity direction of the composite material 51 can be appropriately aligned with the applied load direction, and the fan blade rotor 41 that is much strong against a centrifugal force can be manufactured.

Fifth Embodiment

Next, a method for manufacturing the fan blade rotor 41 according to a fifth embodiment will be described with reference to FIG. 9. Incidentally, also in the fifth embodiment, in order to avoid a duplicated description, portions different from those in the first to fourth embodiments will be described, and portions having the same configurations as those in the first to fourth embodiments will be described with the same reference signs assigned thereto. FIG. 9 is a description view illustrating a way of winding a composite material according to the fifth embodiment.

In the manufacturing method of the fifth embodiment, the way of winding the composite material 51 is different from that of the first embodiment. FIG. 9 is a simplified illustration of the rotating support ring 33 and the permanent magnets 45 similarly to FIG. 5. As illustrated in FIG. 9, when the composite material 51 is wound in steps S2 and S4, the composite material 51 is wound around the rotating support ring 33 and the permanent magnets 45 with a gap between turns of the composite material 51 that are adjacent to each other in the circumferential direction of the rotating support ring 33. Namely, in the composite material 51 that is spirally wound in the circumferential direction, a gap is formed between one turn of the composite material 51 and the other turn of the composite material 51 that are adjacent to each other in the circumferential direction. Since a part of the permanent magnets 45 can be exposed by forming the gap, heat of the permanent magnets 45 can be suitably dissipated to improve cooling performance. A length of the gap in the circumferential direction of the rotating support ring 33 is the same as, for example, a length of the composite material 51 in the width direction.

In addition, in the way of winding the composite material 51 illustrated in FIG. 9, the composite material may be repeatedly wound toward one side in the circumferential direction of the rotating support ring 33 to layer the composite material 51 in the radial direction of the rotating support ring 33. Incidentally, in order to suppress a reduction in strength caused by the formation of the gap, it is preferable that a layer thickness formed by the composite material 51 is thicker than those of the first to fourth embodiments.

As described above, according to the fifth embodiment, since a gap can be formed between turns of the composite materials 51 in the circumferential direction, the cooling performance of the permanent magnets 45 can be improved.

Sixth Embodiment

Figure 10:
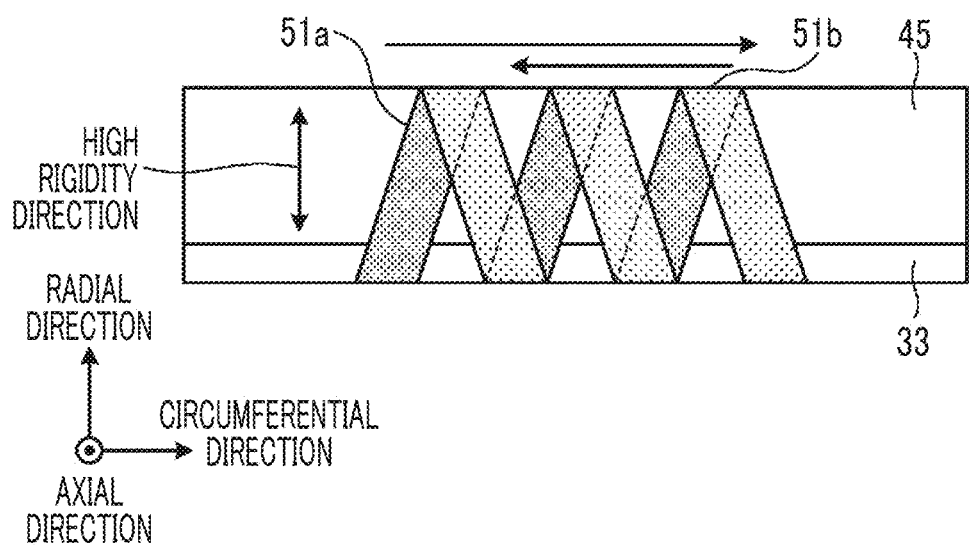
FIG. 10 is a description view illustrating a way of winding a composite material according to a sixth embodiment.

Next, a method for manufacturing the fan blade rotor 41 according to a sixth embodiment will be described with reference to FIG. 10. Incidentally, also in the sixth embodiment, in order to avoid a duplicated description, portions different from those in the first to fifth embodiments will be described, and portions having the same configurations as those in the first and fifth embodiments will be described with the same reference signs assigned thereto. FIG. 10 is a description view illustrating a way of winding a composite material according to the sixth embodiment.

In the manufacturing method of the sixth embodiment, the method for winding the composite material 51 is different from that of the fifth embodiment. FIG. 10 is a simplified illustration of the rotating support ring 33 and the permanent magnets 45 similarly to FIG. 9. As illustrated in FIG. 10, when the composite material 51 is wound in steps S2 and S4, similarly to FIG. 9, the composite material 51 is wound around the rotating support ring 33 and the permanent magnets 45 with a gap between turns of the composite material 51 that are adjacent to each other in the circumferential direction (left-right direction in FIG. 10) of the rotating support ring 33. On the other hand, similarly to FIG. 6 in the second embodiment, the composite material 51 includes the composite material 51a that is wound toward one side in the circumferential direction of the rotating support ring 33, and the composite material 51b that is wound toward the other side in the circumferential direction of the rotating support ring 33. The composite material 51a is spirally wound around the rotating support ring 33 and the permanent magnets 45 as a core, in the forward rotation direction. On the other hand, the composite material 51b is spirally wound around the rotating support ring 33 and the permanent magnets 45 as a core in the reverse rotation direction.

As described above, according to the sixth embodiment, similarly to the second embodiment, since the composite material 51a is wound around the rotating support ring 33 and the permanent magnets 45 in the forward rotation direction, and the composite material 51b is wound therearound in the reverse rotation direction, a fiber direction of the composite material 51a and a fiber direction of the composite material 51b can intersect with each other. For this reason, a circumferential component of a high rigidity direction of the composite material 51a and a circumferential component of a high rigidity direction of the composite material 51b cancel each other out. Therefore, a high rigidity direction of the composite material 51 can be appropriately aligned with the applied load direction, and the fan blade rotor 41 that is much strong against a centrifugal force can be manufactured.

Incidentally, in the first to sixth embodiments, the composite material 51 is a sheet-shaped material having a narrow width, but may be a fiber bundle and is not particularly limited.

In addition, in the first to sixth embodiments, the permanent magnets 45 that are not magnetized are used in step S1, and the permanent magnets 45 are magnetized into magnets in step S5, but are not particularly limited to the configuration. For example, a configuration may be adopted in which the permanent magnets 45 that are magnetized are used in step S1 and step S5 is omitted. In this case, it is preferable that the temperature during curing of the resin is set such that heating does not affect the magnetization of the permanent magnets 45, or that the resin is cured without being subjected to heat. For example, in the first to sixth embodiments, the thermosetting resin is used, but a photo-curable resin or a thermoplastic resin may be used.

In addition, in the first to sixth embodiments, the permanent magnets 45 are configured to be disposed on the outer peripheral side of the rotating support ring 33, but the permanent magnets 45 may be configured to be disposed on an inner peripheral side of the rotating support ring 33.

REFERENCE SIGNS LIST

1 Motor-integrated fan
11 Shaft portion
12 Rotating portion
13 Duct
14 Motor
15 Rolling bearing
16 Guide vane
31 Hub
32 Blade
33 Rotating support ring
38 Suction port
39 Discharge outlet
41 Fan blade rotor
42 Joint fitting
45 Permanent magnet
46 Coil
51 Composite material
55 Magnetizing device

The invention claimed is:

1. A rotor manufacturing method for manufacturing a rotor including a rotating support ring having an annular shape around a rotation axis, magnetic bodies provided alongside the rotating support ring in a radial direction, and a composite material that integrally restrains the rotating support ring and the magnetic bodies, the method comprising:
    a first step of disposing the rotating support ring and the magnetic bodies to be arranged in the radial direction;
    a second step of spirally winding the composite material around the rotating support ring and the magnetic bodies arranged in the radial direction as a core, the composite material being not cured and containing reinforcement fibers infiltrated with a resin that is not cured, in which a fiber direction of the reinforcement fibers is a longitudinal direction; and
    a third step of curing the resin contained in the composite material,
    wherein the rotor further includes a joint fitting for attaching a blade, and
    in the second step, after the composite material is wound around the rotating support ring and the magnetic bodies at a portion before the joint fitting is disposed, the joint fitting is disposed and the composite material is wound around the rotating support ring, the magnetic bodies, and the joint fitting.

2. The rotor manufacturing method according to claim 1, wherein the magnetic bodies in the first step are not magnetized,
    the resin is to be cured by heating,
    in the third step, the resin is heated and cured, and
    the rotor manufacturing method further comprises a fourth step of magnetizing the magnetic bodies into magnets after the third step.

3. The rotor manufacturing method according to claim 1, wherein in the second step, the composite material is wound around an entire circumference of the rotating support ring.

4. The rotor manufacturing method according to claim 1, wherein in the second step, the composite material is wound around the rotating support ring and the magnetic bodies while causing turns of the composite material to be adjacent to each other in a circumferential direction of the rotating support ring.

5. The rotor manufacturing method according to claim 1, wherein in the second step, the composite material is wound around the rotating support ring and the magnetic bodies with a gap between turns of the composite material that are adjacent to each other in a circumferential direction of the rotating support ring.

6. A rotor manufacturing method for manufacturing a rotor including a rotating support ring having an annular shape around a rotation axis, magnetic bodies provided alongside the rotating support ring in a radial direction, and a composite material that integrally restrains the rotating support ring and the magnetic bodies, the method comprising:
 a first step of disposing the rotating support ring and the magnetic bodies to be arranged in the radial direction;
 a second step of spirally winding the composite material around the rotating support ring and the magnetic bodies arranged in the radial direction as a core, the composite material being not cured and containing reinforcement fibers infiltrated with a resin that is not cured, in which a fiber direction of the reinforcement fibers is a longitudinal direction; and
 a third step of curing the resin contained in the composite material,
 wherein in the second step, the composite material is wound around the rotating support ring and the magnetic bodies while causing turns of the composite material to overlap each other in a circumferential direction of the rotating support ring.

7. The rotor manufacturing method according to claim 6, wherein the magnetic bodies in the first step are not magnetized,
 the resin is to be cured by heating,
 in the third step, the resin is heated and cured, and
 the rotor manufacturing method further comprises a fourth step of magnetizing the magnetic bodies into magnets after the third step.

8. The rotor manufacturing method according to claim 6, wherein in the second step, the composite material is wound around an entire circumference of the rotating support ring.

9. A rotor manufacturing method for manufacturing a rotor including a rotating support ring having an annular shape around a rotation axis, magnetic bodies provided alongside the rotating support ring in a radial direction, and a composite material that integrally restrains the rotating support ring and the magnetic bodies, the method comprising:
 a first step of disposing the rotating support ring and the magnetic bodies to be arranged in the radial direction;
 a second step of spirally winding the composite material around the rotating support ring and the magnetic bodies arranged in the radial direction as a core, the composite material being not cured and containing reinforcement fibers infiltrated with a resin that is not cured, in which a fiber direction of the reinforcement fibers is a longitudinal direction; and
 a third step of curing the resin contained in the composite material,
 wherein in the second step, the composite material is wound around the rotating support ring and the magnetic bodies to form at least two layers, and the composite material forming one layer is wound in a forward rotation direction whereas the composite material forming the other layer is wound in a reverse rotation direction.

10. The rotor manufacturing method according to claim 9, wherein in the second step, the composite material forming the one layer is wound toward one side in a circumferential direction of the rotating support ring whereas the composite material forming the other layer is wound toward the other side in the circumferential direction of the rotating support ring.

11. The rotor manufacturing method according to claim 9, wherein the magnetic bodies in the first step are not magnetized,
 the resin is to be cured by heating,
 in the third step, the resin is heated and cured, and
 the rotor manufacturing method further comprises a fourth step of magnetizing the magnetic bodies into magnets after the third step.

12. The rotor manufacturing method according to claim 9, wherein in the second step, the composite material is wound around an entire circumference of the rotating support ring.

13. The rotor manufacturing method according to claim 9, wherein in the second step, the composite material is wound around the rotating support ring and the magnetic bodies while causing turns of the composite material to be adjacent to each other in a circumferential direction of the rotating support ring.

14. The rotor manufacturing method according to claim 9, wherein in the second step, the composite material is wound around the rotating support ring and the magnetic bodies with a gap between turns of the composite material that are adjacent to each other in a circumferential direction of the rotating support ring.

* * * * *